(12) United States Patent
Anders et al.

(10) Patent No.: US 8,265,135 B2
(45) Date of Patent: Sep. 11, 2012

(54) METHOD AND APPARATUS FOR VIDEO PROCESSING

(75) Inventors: Mark Anders, Hillsboro, OR (US); Himanshu Kaul, Portland, OR (US); Sanu Mathew, Hillsboro, OR (US); Steven Hsu, Oswego, OR (US); Amit Agarwal, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1613 days.

(21) Appl. No.: 11/699,241

(22) Filed: Jan. 29, 2007

(65) Prior Publication Data

US 2008/0181295 A1 Jul. 31, 2008

(51) Int. Cl.
*G06F 21/00* (2006.01)

(52) U.S. Cl. ........ 375/240; 708/190; 708/708; 382/236; 382/284; 380/217

(58) Field of Classification Search ................... 375/240
See application file for complete search history.

(56) References Cited

U.S. PATENT DOCUMENTS

| | | | | |
|---|---|---|---|---|
| 3,991,307 A * | 11/1976 | Peddle et al. | ................. | 708/190 |
| 4,839,850 A * | 6/1989 | Noll et al. | .................... | 708/709 |
| 5,931,896 A * | 8/1999 | Kawaguchi | .................. | 708/670 |
| 6,240,433 B1 * | 5/2001 | Schmookler et al. | ......... | 708/270 |
| 6,605,981 B2 * | 8/2003 | Bryant et al. | ................. | 327/534 |
| 6,609,189 B1 * | 8/2003 | Kuszmaul et al. | .............. | 712/23 |
| 7,274,824 B2 * | 9/2007 | Lee et al. | ...................... | 382/236 |
| 7,720,154 B2 * | 5/2010 | Zhou et al. | ............... | 375/240.16 |
| 7,843,462 B2 * | 11/2010 | Poon | ............................. | 345/582 |
| 2002/0083396 A1 * | 6/2002 | Azadet et al. | ................. | 714/796 |
| 2002/0129075 A1 * | 9/2002 | Park et al. | ..................... | 708/505 |
| 2003/0053542 A1 * | 3/2003 | Seok | ......................... | 375/240.16 |
| 2004/0202373 A1 * | 10/2004 | Lee et al. | ...................... | 382/236 |
| 2004/0247029 A1 * | 12/2004 | Zhong et al. | ............. | 375/240.16 |
| 2005/0265454 A1 * | 12/2005 | Muthukrishnan et al. | ........................ | 375/240.16 |
| 2006/0064455 A1 * | 3/2006 | Schulte et al. | ................ | 708/708 |
| 2006/0213766 A1 * | 9/2006 | You | ............................. | 204/228.1 |
| 2007/0297694 A1 * | 12/2007 | Kurata | .......................... | 382/284 |

OTHER PUBLICATIONS http://www.cse.cuhk.edu.hk/~phwl/mt/public/archives/students/mhli.pdf|Variable Block Size Motion Estimation Hardware for Video Encoders|Li Man Ho|Nov. 2006.*
Sum of Absolute Difference Implementations for image processing on FPGAs|http://ieeexplore.ieee.org/stamp/stamp.jsp?tp=&arnumber=5694240|Hiroaki Niitsuma, Tsutomu Maruyama|2010|pp. 1-4.*
T. Koga, et al., "Motion-Compensated Interframe Coding for Video Conferencing," 1981, pp. 1-5.
Shreekant (Ticky) Thakkar and Tom Huff, "Internet Streaming SIMD Extensions," Aug. 1999, pp. 26-34.

* cited by examiner

*Primary Examiner* — Taghi Arani
*Assistant Examiner* — Mahfuzur Rahman
(74) *Attorney, Agent, or Firm* — Trop, Pruner & Hu, P.C.

(57) ABSTRACT

In one embodiment, the invention includes a method for compressing video data using redundant binary mathematics. Other embodiments are described and claimed.

13 Claims, 4 Drawing Sheets

METHOD AND APPARATUS FOR VIDEO PROCESSING

BACKGROUND

Video applications can be computationally expensive. Designers may attempt to compress video data to reduce the workload associated with video data. For example, designers may use compression algorithms that take advantage of the high degree of correlation between successive video frames. One such technique is motion estimation. With motion estimation, a reference image (e.g., a previously encoded frame) is sub-divided into macroblocks of 16×16 pixels. The encoding algorithm attempts to match this macroblock to another macroblock that is in a search window in another image (e.g., a current frame). When the best match is obtained, the motion vector that captures the movement of the macroblock from the reference frame to the current frame is encoded and transmitted in place of the actual block.

A method used for determining whether two blocks match one another is the Sum-of-Absolute Differences (SAD). For every search step within the search window of a macroblock in the reference frame, the SAD for the 256 pixels of the block ($\Sigma_{256}|a_i-b_i|$) is computed. The search may continue until the best match (i.e., lowest SAD) is obtained. This operation may repeat for every macroblock in the reference frame. For high resolution video (e.g., 1920×1080 pixels at 30 frame/sec), the method requires computing the motion vector for 243,000 macroblocks/second. Consequently, motion estimation is computationally expensive.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

A method for computing the SAD of, for example, 8 pairs of operands (e.g., pairs of pixels from different video frames) entails using a subtractor circuit for computing the differences and 1's complement for the pairs of operands. The sign, which is determined by the carry out of the subtractor circuit, selects between the calculated difference and its complement to obtain a positive number at the output of a 2:1 multiplexor. A half adder stage (HA) may be used to sum up the extra 1's for generating the 2's complement for the case where both outputs from the subtractors are negative. The sums after the HA stage are the SADs for 2 input pairs in carry-save format. An adder tree is used to sum up all such SADs to generate the SAD for the 8 input pairs.

Figure 1:
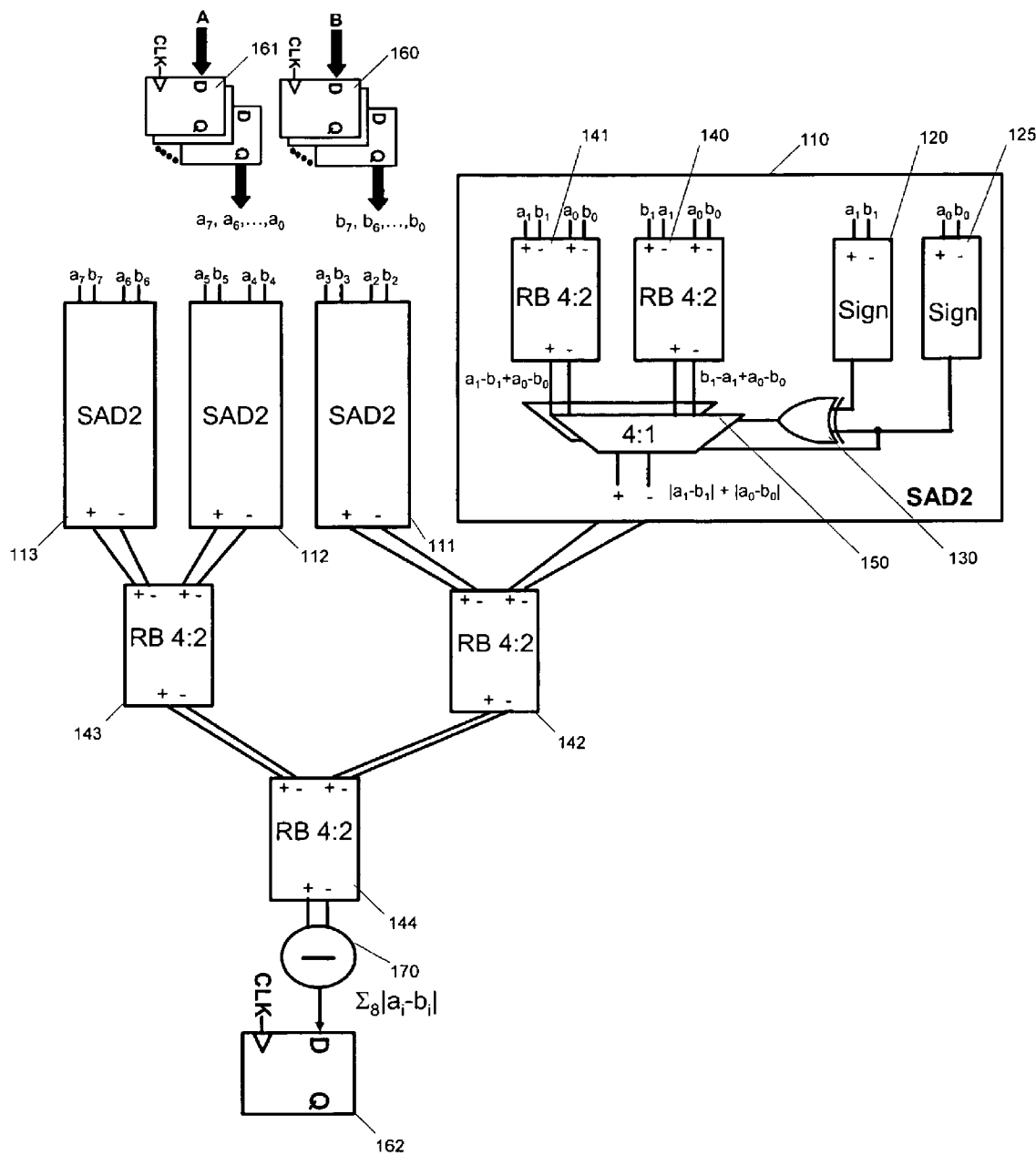
FIG. 1 is a block diagram of an apparatus for video processing in one embodiment of the invention.

One embodiment of the invention incorporates redundant binary (RB) arithmetic to improve methods of signal processing such as, for example, video processing. RB uses a pair of bits $\{a+,a-\}$ to represent the set $\{-1,0,1\}$ using $(a+)-(a-)$ operation. In contrast, a pair of bits $\{a,b\}$ in the conventional binary system represents the set $\{0,1,2\}$ using the a+b operation. In FIG. 1, RB based 4:2 compressors 140, 141, 142, 143, 144 have input pairs of RB numbers $\{a+,a-\}$, $\{b+,b-\}$, input in various arrangements, and the output is a RB number $\{d+,d-\}$ that represents $[(a+)-(a-)]+[(b+)-(b-)]$. This property is beneficial for SAD computation because the pairs of input operands are first subtracted and then summed up. For SAD computation, the ability to negate the initial subtraction result may promote computing the absolute difference based on the sign of the subtraction. This may require extra hardware in the form of an inverter and a HA stage to negate the output and add a 1 in the least significant bit (LSB) for obtaining the 2's complement of the subtraction results. As shown in one embodiment of the invention disclosed in FIG. 1, RB based computation may not require the extra hardware (e.g., inverter, HA) for negation since the result can be negated by, for example, swapping the ordering of the output, i.e., $-\{a+,a-\}=\{a-,a+\}$.

The absolute difference of pairs of numbers may first be computed and then the absolute differences of all pairs of numbers may be summed up using an adder tree. However, as seen in one embodiment of the invention shown in FIG. 1, block 110 shows the summation of 2 pairs of differences that are computed speculatively in parallel with 2 RB 4:2 compressors 140, 141 after receiving data from, for example, flip-flops (e.g., 160, 161). The ordering of inputs for one pair of operands 141 is reversed for RB 4:2 compressor 140. The outputs of the 2 speculative computations 140, 141 are $(a_1-b_1+a_0-b_0)$ and $(b_1-a_1+a_0-b_0)$ respectively. The negatives of these numbers can be obtained by swapping the ordering of the outputs. In other words, the $\{d+,d-\}$ outputs can be sent to the next RB compressor stage 142 as $\{d-,d+\}$. In this manner, the 2 RB 4:2 compressors 140, 141 allow computation of all the 4 possible speculative outputs—$(a_1-b_1+a_0-b_0)$, $(b_1-a_1+a_0-b_0)$, $(b_1-a_1+b_0-a_0)$ and $(a_1-b_1+b_0-a_0)$. One of these 4 possible speculative outputs may represent the SAD for 2 operand pairs. The correct output may be chosen using a 4:1 multiplexor 150 whose select signals are generated by circuits 120, 125, which compute the signs of the differences for each pair of operands in parallel. The sign computation can be computed using a look-ahead carry chain, with the carry-out of this chain representing the sign of the difference.

Figure 2:
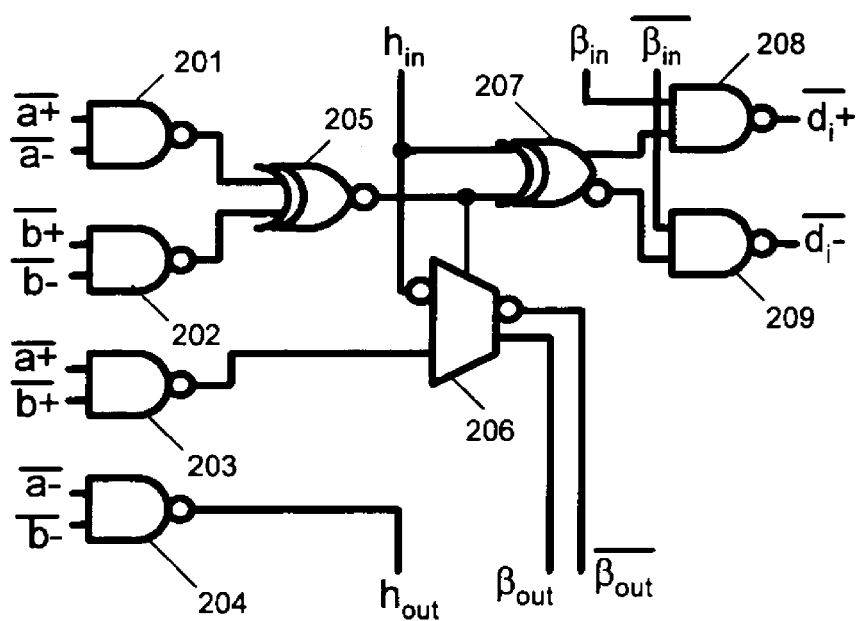
FIG. 2 is a block diagram of a compressor apparatus in one embodiment of the invention.

Negation by reversing the order of the signals in RB format in 4:2 compressor 140 may allow the use of a higher degree of speculation (i.e., 4 possible outputs) with only a 2× increase of compressors, with much lower circuit delay. Though the hardware cost for speculation may increase by 2×, the impact on total power may be much less since the RB 4:2 compressor circuits 140, 141, 142, 143, 144 used in one embodiment of the invention (FIG. 2) have low delay. This may allow downsizing of the RB 4:2 compressors in the SAD2 stage while still keeping them out of the critical path. The critical path may be determined by the sign generation circuits 120, 125 and select signals of the 4:1 multiplexor 150. The fast 4:2 compressor 200 shown in FIG. 2 represents one embodiment of the invention. Data is input into NAND gates 201, 202, 203, 204. Data from NAND gates 201, 202, 203, 204 is sent to XNOR gate 205. Multiplexor 206 is a 2:1 Multiplexor. Gate 207 is a XNOR gate. Finally, NAND gates 208, 209 output data. Compressor 200 may have low latency by constraining the permissible input states of RB numbers to {0,0}, {0,1} and {1,0} for {a+, a−} or {b+, b−}. The inverted inputs in the circuit are thus limited to {1,1}, {1,0}, and {0,1}, which are the respective inversions of the aforementioned permissible input states. In RB, the input pair {1,1} represents the same information as {0,0} and is not allowed. The outputs {d+,d−} of this compressor 200 are constrained to the above mentioned RB number pairs and can directly feed the inputs of the next RB compressor stage 142, 143, 144 (FIG. 1) since they are compatible with the input requirements of the next RB compressor stage. By constraining the allowed inputs and output states in one embodiment of the invention, the number of gates in the critical path of this compressor is reduced. The (β,h) signals propagate in the direction from LSB to most significant bit (MSB) for a single stage of RB 4:2 compressors. In other words, in one embodiment of the invention the (β,h) signals propagate to the neighboring bit and not through all bits. This may allow for constant time computation for a compressor stage. Conventional binary number pairs may need to be converted to the RB constrained input combinations using a single NAND gate stage (not shown) at the input of the RB 4:2 compressor (e.g., 113) in the SAD2 stage of FIG. 1. This NAND gate stage adds a single gate stage delay for a much higher reduction in compressor stage delays in the SAD computation. In one embodiment of the invention, the RB 4:2 circuits of SAD2 are not in the critical path and an extra gate delay in that stage does not change the timing criticality. As a result, the critical path of the SAD circuit remains unchanged.

The final conventional binary number is computed by performing the operation (d+)−(d−) on the final RB number. The subtractor 170 in the last stage of the RB based SAD circuit of FIG. 1 may be used for this final computation in one embodiment of the invention.

At nominal power supply (e.g., 1.2V), one embodiment of the RB SAD invention may be implemented with 8 SADs. This may achieve a performance that is higher than the minimum required for real-time encoding of the highest HDTV resolution, assuming an exhaustive search in a search space of, for example, 15×15 pixels. The performance (or headroom) may improve drastically when common motion estimation algorithms such as a three-step search are applied. The SAD circuitry may use, in one embodiment of the invention, 8-bit data (for pixels) and may sum 8 pairs. However, in other embodiments of the invention, the SAD circuitry is easily scalable to other operand widths and number of summations that need to be performed. Furthermore, power supplies of different voltages may be used in other embodiments of the invention.

Various embodiments of the invention have applications in media applications. Media applications are highly parallelizable workloads and the energy efficiency (GOPS/Watt) of computing these workloads can be increased considerably by operating the circuits at ultra-low power supplies and using parallelism to maintain the same throughput as operating at the nominal supply. To allow improved GOPS/W and to minimize power consumption for lower throughput video constraints, embodiments of the inventive SAD circuit may allow for robust operation at ultra-low and sub-threshold voltage supplies.

Figure 3:
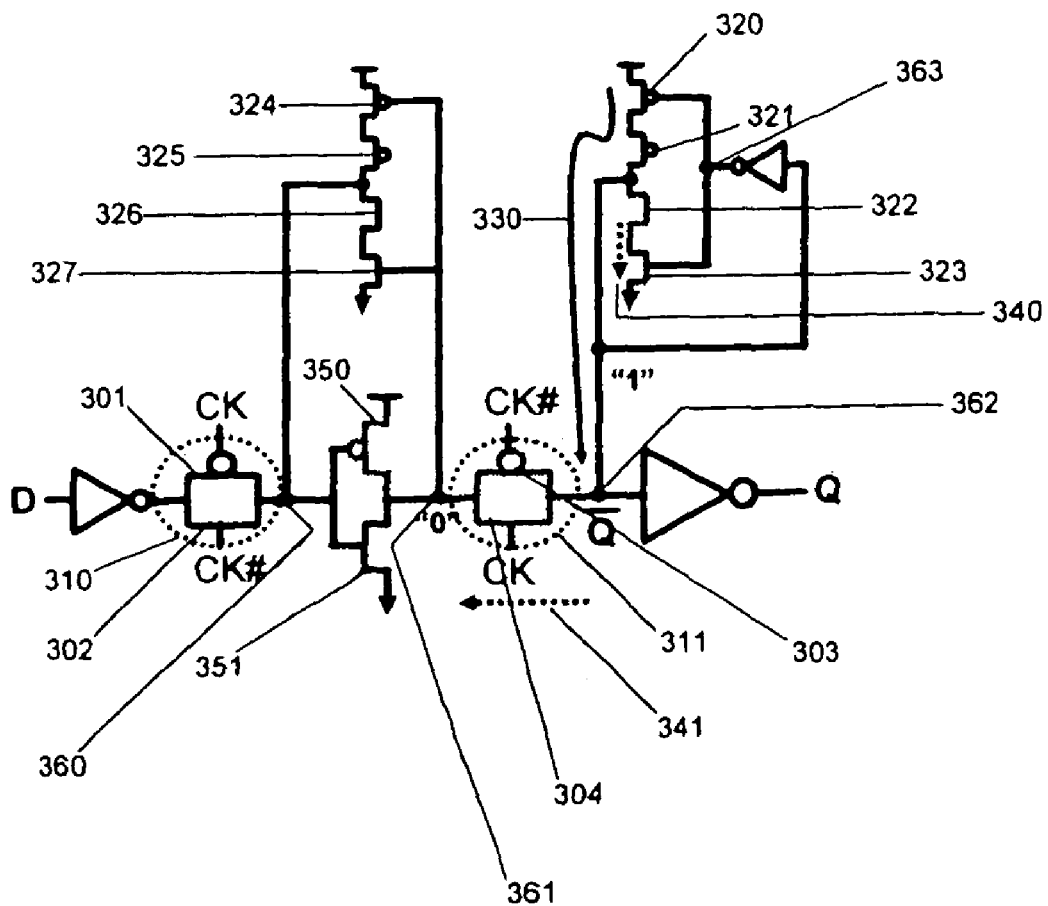
FIG. 3 is a block diagram of a flip-flop apparatus in one embodiment of the invention.

FIG. 3 shows one embodiment of the invention. A flip-flop circuit 300 is used for ultra-low/subthreshold voltage operation. The interruptible feedback for the storage nodes 360 (master data), 361 (inverted master data), 362 (inverted slave data), 363 (slave data) may allow a better read/write stability compared to flip-flops with un-interrupted feedback in the storage nodes. The transistors 301, 302, 303, 304 of the pass gates 310, 311 are low-leakage devices and the interrupted feedback transistors 320, 321, 322, 323, 324, 325, 326, 327 have been upsized from minimum sized transistors. In other words, the transistors are increased in size to promote improved reliability at lower supply voltages. Arrows show the direction of "on" current 330 and the directions of leakage currents 340, 341. The pass-gates 310, 311 may be large in size since they are in the critical path and, at ultra-low supplies, the leakage current through them can be comparable to the "on" current in the stacked and minimum sized feed back transistors. This may result in Vhigh ("1") and Vlow ("0") values that are far from Vcc and Vss. The combination of low-leakage pass gates 310, 311 and upsized feedback transistors 320, 321, 322, 323 may have a significant impact on the flip-flop delay at nominal supply (e.g., 1.2V) and may significantly increase capacitance on the clock network, while allowing minimum operating voltage of the flip-flop to be lowered considerably.

Figure 4:
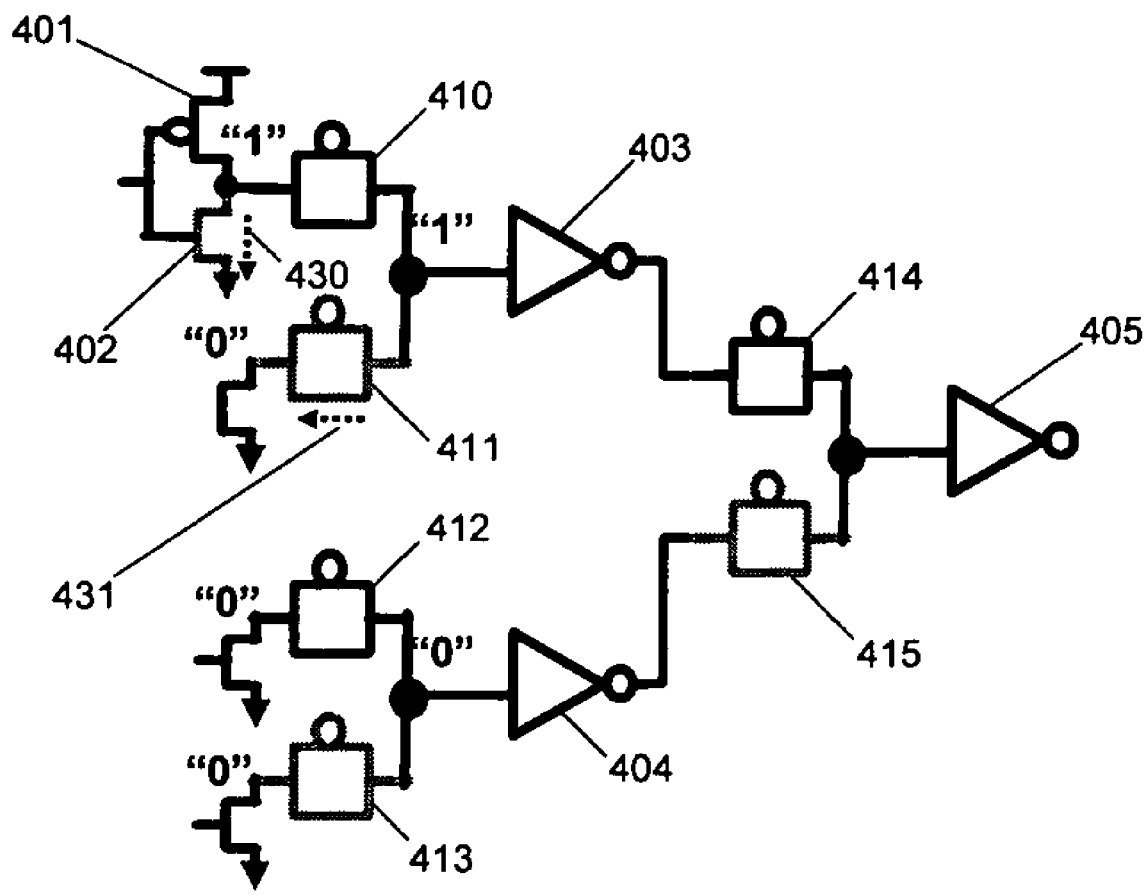
FIG. 4 is a block diagram of a multiplexor apparatus in one embodiment of the invention.

In one embodiment of the invention, the 4:1 multiplexor 150 in the SAD2 stage 110 of FIG. 1 may use encoded select signals with 2 stages of 2:1 multiplexors. FIG. 4 is one embodiment of the invention with a 2-stage 2:1 multiplexor with encoded select signals for ultra low voltage operation. The multiplexor may have transistors (e.g., 401, 402) that help form, for example, inverters. Various inverters (e.g., 403, 404, 405) are included in the multiplexor. In addition, various transmission gates (e.g., 410, 411, 412, 413, 414, 415) are also included in the multiplexor. Finally, leakage paths 430, 431 are indicated in FIG. 4. A wide single stage multiplexor with decoded selects may result in a higher number of leakage paths on the node common to all the pass gates. Reduced Ion/Ioff ratios may make such a design unsuitable for ULV operation. With multiple stages of 2:1 multiplexors (for implementing a wide multiplexor), as seen in FIG. 4, the number of leakage paths at any node reduces considerably, thereby improving robustness for ULV operation. Improved noise margins may be allowed by the 2 stage 4:1 multiplexor.

The overall SAD circuit delay penalty for using the flip-flop (FIG. 3) and 4:1 multiplexor designs (FIG. 4) optimized for ULV operation may be <2% at nominal supply (1.2V). This may allow a SAD circuit to operate more reliably at ultra-low voltages and, thereby, may help realize much higher energy efficiency (>5×) at ultra-low supply voltages.

Certain embodiments of the invention may be directed to areas other than video processing or video compression. For example, various embodiments of the invention may be related to signal processing (e.g., sum of errors) or the general calculation of SADs using RB.

While the present invention has been described with respect to a limited number of embodiments, those skilled in the art will appreciate numerous modifications and variations therefrom. It is intended that the appended claims cover all such modifications and variations that fall within the true spirit and scope of this present invention.

What is claimed is:

1. A method comprising:
    compressing video data using redundant binary mathematics;
    using redundant binary mathematics and a flip-flop circuit to compute a plurality of speculative sum-of-absolute differences values; and
    selecting a sum-of-absolute differences value from the plurality of speculative sum-of-absolute differences values;
    wherein selecting the sum-of-absolute differences value from the plurality of speculative sum-of-absolute differences values includes selecting a first sum-of-absolute differences value but not a second sum-of-absolute differences value, the first and second sum-of-absolute differences values being included in the plurality of speculative sum-of-absolute differences values.

2. The method of claim 1 comprising using the flip-flop circuit with an interruptible feedback path to compute the sum-of-absolute differences value.

3. The method of claim 2 comprising using a power supply of less than 0.3 volts to power a circuit to compute the sum-of-absolute differences value.

4. The method of claim 1 comprising using a multistage multiplexor to select the sum-of-absolute differences value from the plurality of candidate sum-of-absolute differences values.

5. The method of claim 1 comprising allowing no more than three permissible input states of redundant binary numbers for a compressor circuit used to compute the sum-of-absolute differences value.

6. The method of claim 1 comprising computing a first difference for a first pair of values and a second difference for a second pair of values; computing a first sum of the first difference and the second difference; and then computing the sum-of-absolute differences value based on the first sum.

7. The method of claim 1 including using redundant binary mathematics to compute the sum-of-absolute differences value in a bit-parallel manner.

8. The method of claim 5, wherein the compressor circuit includes a 4:2 compressor.

9. An apparatus comprising:
    logic to compress video data based on redundant binary mathematics;
    a compressor to receive two redundant binary mathematics operands and to compute at least four speculative sum-of-absolute differences values, for the two redundant binary mathematics operands, based on redundant binary mathematics; and
    a multistage multiplexor to select a sum-of-absolute differences value from the at least four speculative sum-of-absolute differences values;
    wherein the compressor is to allow no more than three permissible input states of redundant binary numbers.

10. The apparatus of claim 9 further comprising a flip-flop circuit with an interruptible feedback path to compute the sum-of-absolute differences value.

11. The apparatus of claim 9, the logic to compute a first difference for a first pair of values and a second difference for a second pair of values; compute a first sum of the first difference and the second difference; and then compute the sum-of absolute differences value based on the first sum.

12. An apparatus comprising:
    logic to compress video data using redundant binary mathematics;
    a flip-flop circuit to compute a plurality of speculative sum-of-absolute differences values using redundant binary mathematics; and
    a multiplexor to select a sum-of-absolute differences value from the plurality of speculative sum-of-absolute differences values;
    wherein the multiplexor is to select the sum-of-absolute differences value from the plurality of speculative sum-of-absolute differences values by performing operations including selecting a first sum-of-absolute differences value but not a second sum-of-absolute differences value, the first and second sum-of-absolute differences values being included in the plurality of speculative sum-of-absolute differences values.

13. The apparatus of claim 12 including a compressor that allows no more than three permissible input states of redundant binary numbers.

* * * * *